US012167133B2

(12) United States Patent
Song et al.

(10) Patent No.: US 12,167,133 B2
(45) Date of Patent: Dec. 10, 2024

(54) CAMERA MODULE

(71) Applicant: LG INNOTEK CO., LTD., Seoul (KR)

(72) Inventors: Yun Sang Song, Seoul (KR); Jung Shik Baik, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 152 days.

(21) Appl. No.: 17/995,249

(22) PCT Filed: May 14, 2021

(86) PCT No.: PCT/KR2021/006098
§ 371 (c)(1),
(2) Date: Sep. 30, 2022

(87) PCT Pub. No.: WO2021/230719
PCT Pub. Date: Nov. 18, 2021

(65) Prior Publication Data
US 2023/0171497 A1      Jun. 1, 2023

(30) Foreign Application Priority Data
May 15, 2020   (KR) .................. 10-2020-0058702

(51) Int. Cl.
*H04N 5/335*       (2011.01)
*H04N 23/51*       (2023.01)
*H04N 23/54*       (2023.01)
*H04N 23/55*       (2023.01)
*H04N 23/57*       (2023.01)
*H04N 23/68*       (2023.01)

(52) U.S. Cl.
CPC ........... *H04N 23/687* (2023.01); *H04N 23/51* (2023.01); *H04N 23/54* (2023.01); *H04N 23/55* (2023.01); *H04N 23/57* (2023.01)

(58) Field of Classification Search
CPC ..................................................... H04N 23/54
See application file for complete search history.

(56) References Cited

FOREIGN PATENT DOCUMENTS

| CN | 206788527 U | 12/2017 |
|---|---|---|
| JP | 2017-83582 A | 5/2017 |
| KR | 10-2010-0005313 A | 1/2010 |

(Continued)

OTHER PUBLICATIONS

International Search Report dated Aug. 12, 2021 in International Application No. PCT/KR2021/006098.
(Continued)

*Primary Examiner* — Gary C Vieaux
(74) *Attorney, Agent, or Firm* — Saliwanchik, Lloyd & Eisenschenk

(57) ABSTRACT

The present embodiment relates to a camera module comprising: a housing including a first surface; a holder including a lens, and including a second surface which faces the first surface and is formed on the outer surface of the holder; and a guide member disposed between the first surface and the second surface, wherein the first surface and the second surface have curved surfaces, the curved surface of the second surface is a curved surface of which the central portion further protrudes outward than the top and bottom thereof, and the curved surface of the first surface is a curved surface of which the central portion is more recessed than the top and bottom thereof.

20 Claims, 12 Drawing Sheets

(56) References Cited

FOREIGN PATENT DOCUMENTS

| | | |
|---|---|---|
| KR | 10-2010-0061229 A | 6/2010 |
| KR | 10-2010-0103297 A | 9/2010 |
| KR | 10-2015-009685 A | 1/2015 |
| KR | 10-2015-0101671 A | 9/2015 |
| KR | 10-2018-0022367 A | 3/2018 |

OTHER PUBLICATIONS

Office Action dated Sep. 25, 2024 in Chinese Application No. 202180035010.7. No translation provided,.

CAMERA MODULE

CROSS-REFERENCE TO RELATED APPLICATIONS

This application is the U.S. national stage application of International Patent Application No. PCT/KR2021/006098, filed May 14, 2021, which claims the benefit under 35 U.S.C. § 119 of Korean Application No. 10-2020-0058702, filed May 15, 2020, the disclosures of each of which are incorporated herein by reference in their entirety.

TECHNICAL FIELD

The present invention relates to a camera module.

BACKGROUND ART

As the spread of various portable terminals is widely generalized and wireless Internet services are commercialized, the demands of consumers related to portable terminals are also diversifying, so that various types of additional devices are being installed in the portable terminals.

Among them, there is a camera module for photographing a subject as a photograph or a moving picture. Meanwhile, a camera module in recent years has been applied with a handshake correction function that inhibits the image from being shaken due to hand shake of a photographer.

However, the OIS structure of the conventional camera module tilt method is a two-axis image stabilization method for yawing/pitching that rotates about the X axis/Y axis, and there is a disadvantage in that handshake caused by rolling that rotates about the Z-axis cannot be corrected.

DETAILED DESCRIPTION OF THE INVENTION

Technical Subject

The present embodiment is intended to provide a camera module capable of driving auto focusing (AF) as well as 3-way image stabilization (OIS) in yawing, pitching, and rolling directions using a module tilt method in which the lens and image sensor move together.

Technical Solution

A camera module according to the present embodiment comprises: a housing comprising a first surface; a holder comprising a lens, and comprising a second surface which faces the first surface and is formed on an outer side surface of the holder; and a guide member being disposed between the first surface and the second surface, wherein the first surface and the second surface have curved surfaces, wherein the curved surface of the second surface is a curved surface in which the central portion is convex outwardly than the upper portion and the lower portion, and wherein the curved surface of the first surface may be a curved surface in which the central portion is concave outwardly than the upper portion and the lower portion.

The holder is tilt-driven against the housing; the upper portion of the second surface is the uppermost portion where the guide member is in contact with when the holder is tilted about the first axis perpendicular to the optical axis of the lens; and the lower portion of the second surface may be the lowermost portion where the guide member is in contact with when the holder is tilted about the first axis.

The outer circumference of the holder may have a circular shape, and the thickness of the outer circumference of the holder may be formed such that the central portion is thicker than the upper portion or the lower portion.

The first surface may comprise a groove in which the guide member is disposed.

The guide member may be fixed to the groove.

The curvature of the curved surface of the first surface may be the same as the curvature of the curved surface of the second surface.

The curvature of the curved surface of the first surface and the curvature of the curved surface of the second surface may be different from each other.

The guide member may comprise a first ball and a second ball, and the first ball and the second ball may be disposed at positions symmetrical to each other with respect to the central portion.

The camera module may comprise: a bobbin being disposed inside the holder; a first coil being disposed in the bobbin; a magnet being disposed in the holder; and a second coil disposed in the housing.

The camera module may comprise: a first substrate being coupled to the holder; a lens being disposed in the bobbin; and an image sensor being disposed in the first substrate.

The camera module may comprise: a second substrate being disposed below the first substrate; and an elastic member connecting the first substrate and the second substrate, wherein the housing may be coupled to the second substrate.

The elastic member may be formed such that the first substrate and the second substrate are spaced apart from each other in an initial state in which no current is applied to the first coil and the second coil.

The elastic member may comprise: an inner portion being coupled to the first substrate; an outer portion being coupled to the second substrate; and a connection portion connecting the inner side portion and the outer side portion, wherein the connection portion has elasticity and may comprise a bent shape.

The elastic member may comprise a plurality of elastic portions spaced apart from each other and electrically connecting the first substrate and the second substrate, and the plurality of elastic portions may comprise at least 20 elastic portions.

It comprises a cover being coupled to the second substrate, wherein the housing is disposed in the cover and may be coupled to the cover.

The housing comprises a plurality of bodies being spaced apart from each other, and each of the plurality of bodies may be fixed to an inner surface of the side plate of the cover by an adhesive.

It comprises a third substrate electrically connected to the second substrate, and the second coil may be disposed in the third substrate.

The third substrate comprises a first surface facing the magnet and a second surface opposite to the first surface of the third substrate; the second coil is disposed on the first surface of the third substrate; and a metal yoke may be disposed on the second surface of the third substrate.

The third substrate may be coupled to the housing.

When a current is applied to the first coil, the bobbin moves along an optical axis due to electromagnetic interaction between the first coil and the magnet, so that the distance between the lens and the image sensor may be changed.

The second coil comprises first to third coil portions to which current is individually applied, wherein the magnet comprises first to third magnets, wherein the first magnet has a first surface facing the first coil. and a second surface disposed opposite the first surface of the first magnet and facing the first coil part, wherein the second magnet comprises a first surface facing the first coil and a second surface and a second surface being disposed opposite to the first surface of the second magnet and facing the second coil part, and wherein the third magnet may face the third coil portion.

The second surface of each of the first magnet and the second magnet comprises a first region and a second region being disposed below the first region and having a polarity different from that of the first region; the third magnet comprises a first surface facing the third coil portion; and the first surface of the third magnet may comprise a first region and a second region being disposed on a side of the first region of the third magnet and having a polarity different from that of the first region of the third magnet.

The first surface of each of the first magnet and the second magnet comprises a third region and a fourth region being disposed below the third region and having a polarity different from that of the third region, and the first coil may be overlapped with one of the third region and the fourth region in a direction perpendicular to the optical axis.

When a current is applied to the first coil portion, the holder rotates about a first axis perpendicular to the optical axis; when a current is applied to the second coil portion, the holder rotates about a second axis perpendicular to the optical axis and the first axis; and when a current is applied to the third coil portion, the holder may rotate about the optical axis.

When the holder rotates, the bobbin, the lens, and the image sensor may rotate integrally with the holder to maintain a distance between the lens and the image sensor.

The guide member may comprise a first ball.

It may comprise a second ball being disposed between the bobbin and the holder.

The holder may comprise a groove formed on an inner surface of the holder in which the second ball is disposed, and the groove of the holder may be extended longer than a diameter of the second ball in an optical axis direction.

It may comprise an elastic member connecting the bobbin and the holder.

The camera module may comprise: a sensor base being disposed between the bobbin and the first substrate; and a filter being disposed in the sensor base.

The first ball may comprise eight balls passing through a first virtual plane perpendicular to the optical axis and eight balls passing through a second virtual plane perpendicular to the optical axis and spaced apart from the first plane.

The first ball may comprise four balls through which a third virtual plane comprising an optical axis passes, and the four balls may be symmetrical with respect to the optical axis.

The optical device according to this embodiment comprises a main body; the camera module being disposed on the main body; and a display being disposed in the main body and outputting an image photographed by the camera module.

The camera module according to this embodiment comprises: a stator comprising a first coil; a mover comprising a lens and being disposed inside the stator; and a guide member being disposed between the stator and the mover, wherein the mover comprises a first mover comprising a second coil and a second mover comprising a magnet, wherein the first mover is disposed inside the second mover and is movably disposed along the first axis, wherein the second mover is rotatably disposed about a first axis, a second axis different from the first axis, and a third axis different from the first axis and the second axis with respect to the stator, and wherein the magnet may comprise a first magnet rotating the first mover with respect to the one axis among the second axis and the third axis by interaction with the first coil, and a second magnet rotating the first mover with respect to the first axis and moving the second mover along the first axis by interaction with the second coil.

The camera module according to the present embodiment comprises: a stator comprising a first coil and a second coil; a mover comprising a lens and being disposed inside the stator; and a guide member being disposed between the stator and the mover, wherein the mover comprises a first mover comprising a third coil and a second mover comprising a magnet, wherein the magnet comprises a first magnet and a second magnet, wherein the first mover is movably disposed along the first axis by the interaction between the second magnet and the third coil, and wherein the mover may be disposed to be rotated about a first axis by the first magnet and the first coil, and rotated about a second axis different from the first axis by the second magnet and the second coil.

The camera module according to the present embodiment comprises: a stator comprising a first surface; a mover comprising a lens and a second surface facing the stator; and a guide member being disposed between the first surface and the second surface, wherein the first surface and the second surface have curved surfaces corresponding to each other, wherein the mover comprises a first substrate in which the image sensor is disposed, wherein the stator comprises a second substrate electrically connected to the image sensor and being disposed to be spaced apart from the first substrate, wherein an interposer for elastically connecting the first substrate and the second substrate and delivering a signal being outputted from the image sensor is comprised, and wherein at least a portion of the interposer may be disposed between the first substrate and the second substrate.

The stator may comprise a spacer member for disposing the first substrate and the second substrate to be spaced apart from each other.

The spacer member may be a cover member disposed on the second substrate.

The camera module according to the present embodiment comprises: a housing comprising a first surface; a holder comprising a lens and comprising a second surface facing the first surface and formed on an outer side surface; and a guide member being disposed between the first surface and the second surface, wherein the first surface and the second surface have a curved surface, wherein the curved surface of the second surface is a curved surface in which the central portion is convex outwardly than the upper portion and the lower portion, and wherein the curved surface of the first surface may be a curved surface in which the central portion is concave outwardly than the upper portion and the lower portion.

The camera module according to the present embodiment comprises: a stator comprising a first surface; a mover comprising a lens and comprising a second surface facing the first surface and tilt-driven with respect to the stator with respect to three different axes; and a guide member disposed between the first surface and the second surface, wherein the first surface and the second surface have a curved surface, and wherein each curved surface of the first surface and the second surface may be a curved surface formed in a direction in which the mover is tilted.

The camera module according to the present embodiment comprises: a housing; a holder being disposed within the housing; a bobbin being disposed in the holder; a first substrate being coupled to the holder; a lens being disposed on the bobbin; an image sensor being disposed on the first substrate; a first coil being disposed on the bobbin; a magnet being disposed on the holder; a second coil being disposed in the housing; and a first ball being disposed between the housing and the holder, wherein the housing comprises a first surface comprising a curved surface, wherein the holder comprises a second surface comprising a curved surface and facing the first surface of the housing, and wherein the first ball may be disposed between the first surface of the housing and the second surface of the holder.

The housing comprises a groove formed in a shape corresponding to a portion of the first ball on the first surface of the housing, wherein a portion of the first ball is accommodated in the groove of the housing, and wherein the first ball is can move along the curved surface of the holder.

The holder comprises a groove formed in a shape corresponding to a portion of the first ball on the second surface of the holder, wherein a portion of the first ball is accommodated in the groove of the holder, and wherein the first ball is may move along the curved surface of the housing.

The curvature of the curved surface of the housing may be at least in part equal to the curvature of the curved surface of the holder.

The curved surface of the holder may be formed so that the central portion is more convex than the upper portion and the lower portion.

The camera module may comprise a second substrate being disposed below the first substrate; and an elastic member connecting the first substrate and the second substrate, wherein the housing may be coupled to the second substrate.

The elastic member may be formed such that the first substrate and the second substrate are spaced apart from each other in an initial state in which no current is applied to the first coil and the second coil.

The elastic member comprises an inner side portion being coupled to the first substrate, an outer side portion being coupled to the second substrate, and a connection portion connecting the inner side portion and the outer side portion, wherein the connection portion has elasticity and may comprise a bent shape.

The elastic member may comprise a plurality of elastic portions spaced apart from each other and electrically connecting the first substrate and the second substrate, wherein the plurality of elastic portions may comprise at least 20 elastic portions.

The camera module may comprise a cover being coupled to the second substrate, wherein the housing may be disposed inside the cover and coupled to the cover.

The housing may comprise a plurality of bodies spaced apart from each other, wherein each of the plurality of bodies may be fixed to an inner surface of the side plate of the cover by an adhesive.

The camera module may comprise a third substrate electrically connected to the second substrate, wherein the second coil may be disposed on the third substrate.

The third substrate comprises a first surface facing the magnet and a second surface opposite to the first surface, wherein the second coil is disposed on the first surface of the third substrate, and wherein a yoke made of a metal material may be disposed on the second surface of the third substrate.

The third substrate may be coupled to the housing.

When a current is applied to the first coil, the bobbin moves along an optical axis due to electromagnetic interaction between the first coil and the magnet, so that the distance between the lens and the image sensor may be changed.

The second coil comprises first to third coil portions to which current is applied individually, wherein the magnet comprises first to third magnets, wherein the first magnet comprises a first surface facing the first coil, and a second surface being disposed opposite to the first surface and facing the first coil portion, wherein the second magnet comprises a first surface facing the first coil, and a second surface disposed opposite the first surface of the second magnet and facing the second coil portion, and wherein the third magnet may face the third coil portion.

The second surface of each of the first magnet and the second magnet comprises a first region and a second region disposed below the first region and having a polarity different from that of the first region, wherein the third magnet comprises a first surface facing the third coil portion, wherein the first surface of the third magnet may comprise a first region and a second region being disposed on a side of the first region of the third magnet and having a polarity different from that of the first region of the third magnet.

The first surface of each of the first magnet and the second magnet comprises: a third region and a fourth region being disposed below the third region and having a polarity different from that of the third region, wherein the first coil may be overlapped with one of the third region and the fourth region in a direction perpendicular to the optical axis.

When a current is applied to the first coil portion, the holder rotates about a first axis perpendicular to the optical axis; when a current is applied to the second coil portion, the holder rotates about the optical axis and a second axis perpendicular to the first axis; and when a current is applied to the third coil portion, the holder may rotate about the optical axis.

When the holder rotates, the bobbin, the lens, and the image sensor may rotate integrally with the holder so that the distance between the lens and the image sensor can be maintained.

It may comprise a second ball being disposed between the bobbin and the holder.

The holder may comprise a groove formed on an inner surface of the holder in which the second ball is disposed, wherein the groove of the holder may be extended longer than the diameter of the second ball in an optical axis direction.

It may comprise an elastic member connecting the bobbin and the holder.

The camera module may comprise: a sensor housing disposed between the bobbin and the first substrate; and a filter disposed in the sensor housing.

The first ball may comprise: eight balls through which a first virtual plane perpendicular to the optical axis passes; and eight balls through which a second virtual plane perpendicular to the optical axis and spaced apart from the first plane passes.

The first ball may comprise four balls through which a third virtual plane comprising an optical axis passes, wherein the four balls may be symmetrical with respect to the optical axis.

The optical device according to the present embodiment may comprise: a main body; a camera module of claim 1 being disposed in the main body; and a display being disposed in the main body and outputting an image photographed by the camera module.

The camera module according to the present embodiment comprises: a stator; a first mover being disposed inside the stator; and a second mover being disposed between the stator and the first mover, wherein the first mover is movably disposed in the optical axis direction with respect to the second mover, wherein the second mover is rotatably disposed about an optical axis with respect to the stator, a first axis perpendicular to the optical axis, and a second axis perpendicular to the optical axis and the first axis, respectively, wherein the stator comprises a first surface comprising a curved surface, wherein the second mover comprises a second surface comprising a curved surface and facing the first surface of the stator, and wherein a ball for guiding the movement of the second mover may be disposed between the first surface of the stator and the second surface of the second mover.

The first mover comprises a bobbin and a lens being coupled to the bobbin, wherein the second mover comprises a holder, a substrate being coupled to the holder, and an image sensor being disposed on the substrate, and wherein the lens may rotate together with the image sensor when the second mover rotates.

The first mover comprises a first coil; the second mover comprises a magnet; the stator comprises second to fourth coils to which current is individually applied; the first mover moves in the optical axis direction with respect to the second mover when current is applied to the first coil; the second mover rotates about the optical axis with respect to the stator when a current is applied to the second coil; the second mover rotates about the first axis with respect to the stator and when a current is applied to the third coil; and the second mover may rotate about the second axis with respect to the stator when a current is applied to the fourth coil.

Advantageous Effects

Through the present embodiment, a three-way image stabilization (OIS) function in yawing, pitching, and rolling directions using a module tilt method in which the lens and image sensor move together.

Furthermore, in the case of moving only one among the lens and the image sensor, image quality degradation occurs in the edge region of the image sensor, but the present embodiment has the advantage that image quality does not deteriorate from the central region to the edge region of the image sensor through the module tilt method.

BEST MODE

Figure 1:
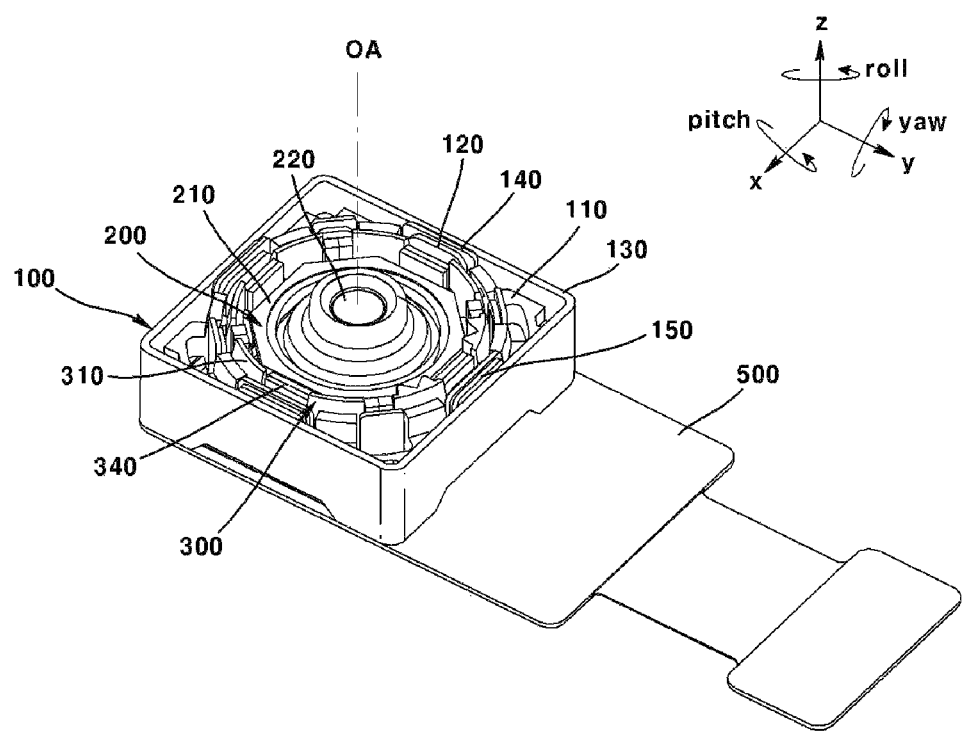
FIG. 1 is a perspective view of a camera module according to the present embodiment.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

The description of 'first, second, and third' used hereinafter may be arbitrarily described in order to distinguish components referred to by the same term from each other. For example, in order to distinguish the two coils 120 and 230, one coil may be referred to as a first coil and the other coil may be referred to as a second coil. Hereinafter, the first coil 230 and the second coil 120 are described, but the coil corresponding to the reference numeral 230 may be referred to as a second coil, and the coil corresponding to the reference numeral 120 may be referred to as the first coil. This description can be analogically applied to various terms such as 'coil, magnet, ball, mover, groove,' and the like. In particular, 'first, second, and third' may be described sequentially from the first configuration in the claims.

An 'optical axis (refer to OA of FIGS. 1 and 13) direction' used below is defined as an optical axis direction of a lens and/or an image sensor coupled to the lens driving device.

The 'vertical direction' used hereinafter may be a direction parallel to the optical axis direction. The vertical direction may correspond to the 'z-axis direction (refer to FIG. 1)'. The 'horizontal direction' used hereinafter may be a direction perpendicular to the vertical direction. That is, the horizontal direction may be a direction perpendicular to the optical axis. Accordingly, the horizontal direction may comprise an 'x-axis direction' and a 'y-axis direction' (refer to FIG. 1).

The 'auto focus function' used hereinafter is defined as a function to automatically focus on the subject by adjusting the distance from the image sensor by moving the lens in the optical axis direction according to the distance of the subject so that the image sensor can obtain a clear image of the subject. Meanwhile, 'auto focus' may correspond to 'AF (Auto Focus)'. In addition, it may be used interchangeably with 'auto focusing'.

The 'hand shake correction function' used hereinafter is defined as a function of moving a lens and/or an image sensor to offset vibration (movement) generated in the image sensor by an external force. Meanwhile, 'handshake correction' may correspond to 'optical image stabilization (OIS)'.

'Yawing' used hereinafter may be a movement in a yaw direction that rotates about a y-axis (refer to FIG. 1). 'Pitching' used hereinafter may be a movement in a pitch direction rotating about an x-axis (refer to FIG. 1). 'Rolling' used hereinafter may be a movement in a roll direction rotating about the z-axis (refer to FIG. 1). Or, a movement rotating about the y-axis may be defined as pitching, and a movement rotating about the x-axis may be defined as a yawing.

Hereinafter, the configuration of the camera module will be described with reference to the drawings.

Figure 2:
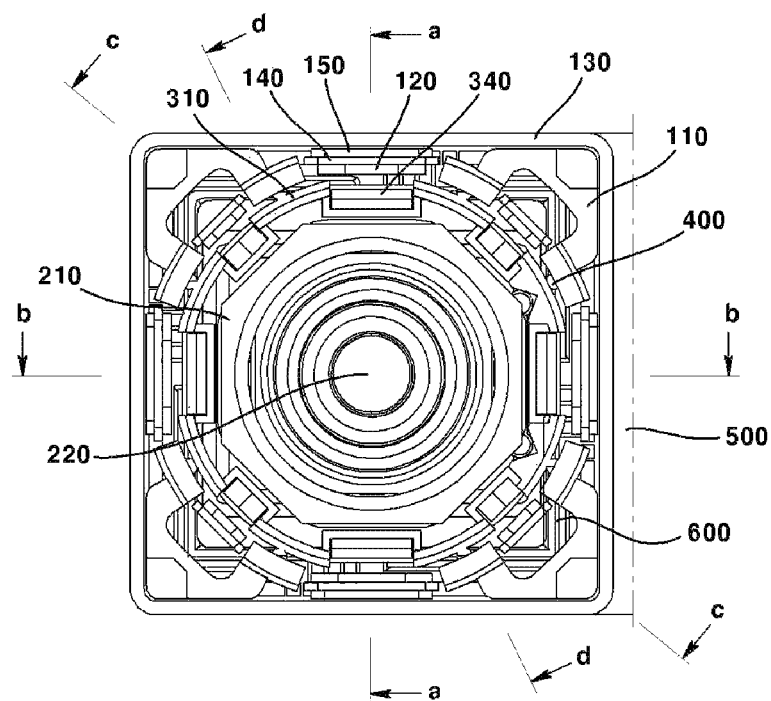
FIG. 2 is a plan view of a camera module according to the present embodiment.
Figure 3:
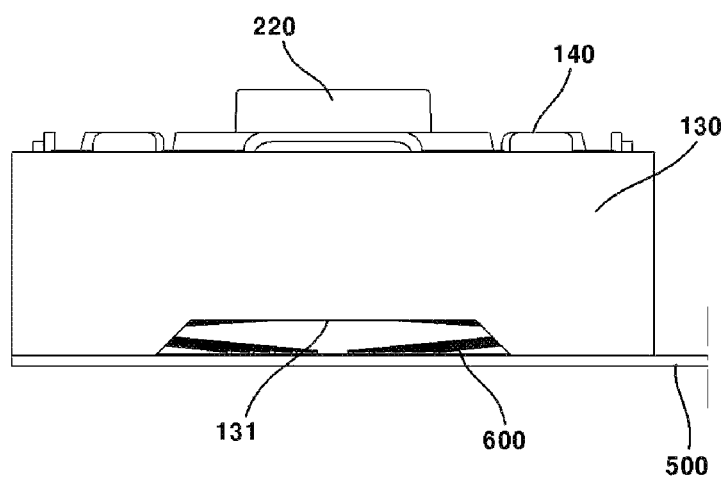
FIG. 3 is a side view of a camera module according to the present embodiment.
Figure 4:
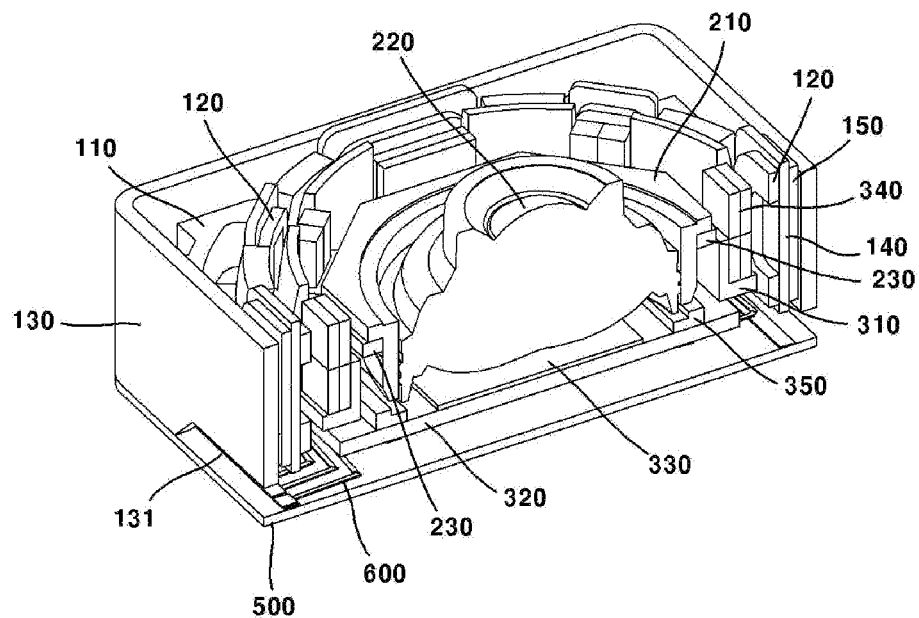
FIG. 4 is a cross-sectional perspective view taken along line a-a in FIG. 2.
Figure 5:
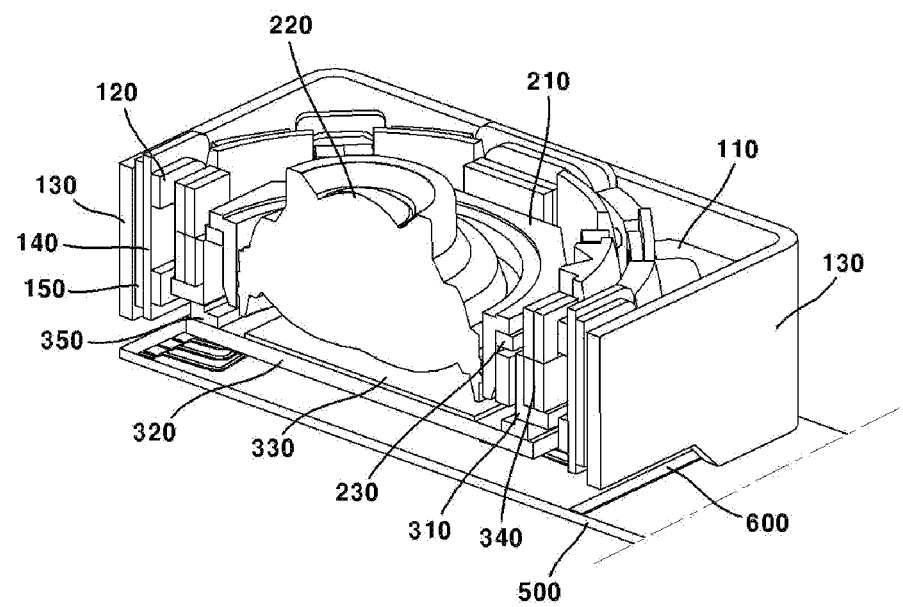
FIG. 5 is a cross-sectional perspective view taken along line b-b in FIG. 2.
Figure 6:
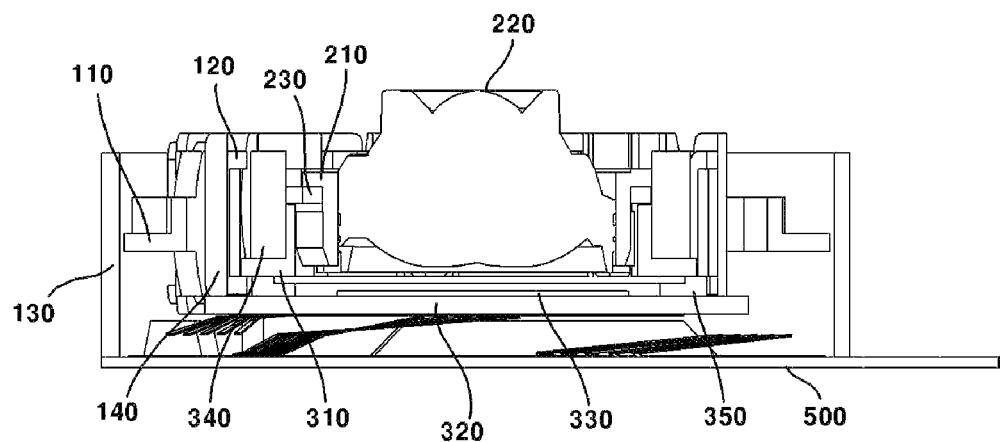
FIG. 6 is a cross-sectional view taken along line c-c in FIG. 2.
Figure 7:
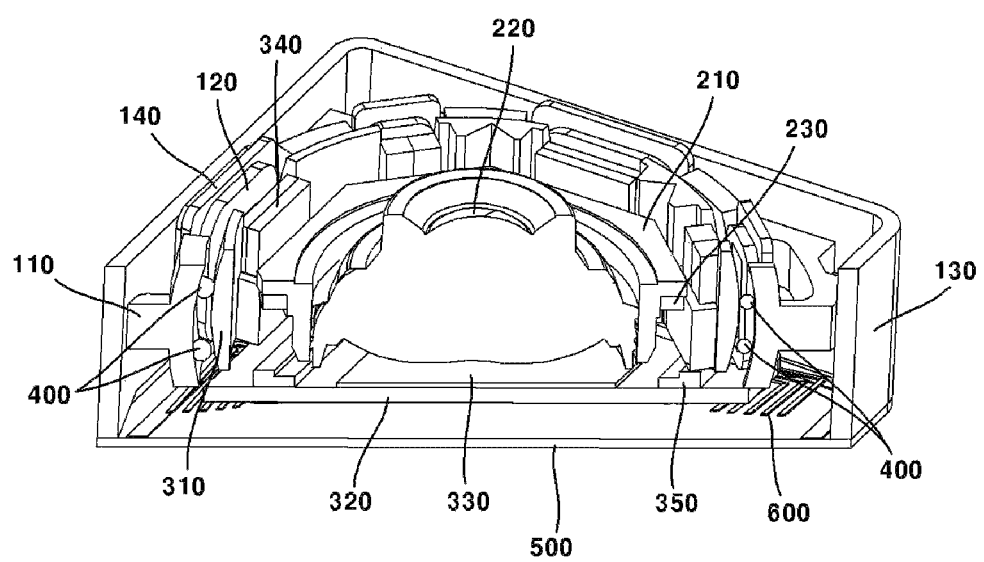
FIG. 7 is a cross-sectional perspective view taken along line d-d in FIG. 2.
Figure 8:
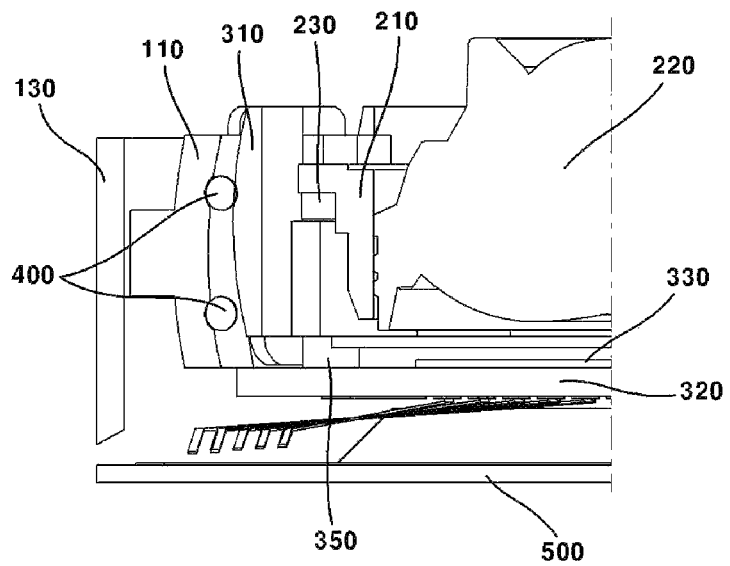
FIG. 8 is an enlarged cross-sectional view of a part of a camera module according to the present embodiment.
Figure 9:
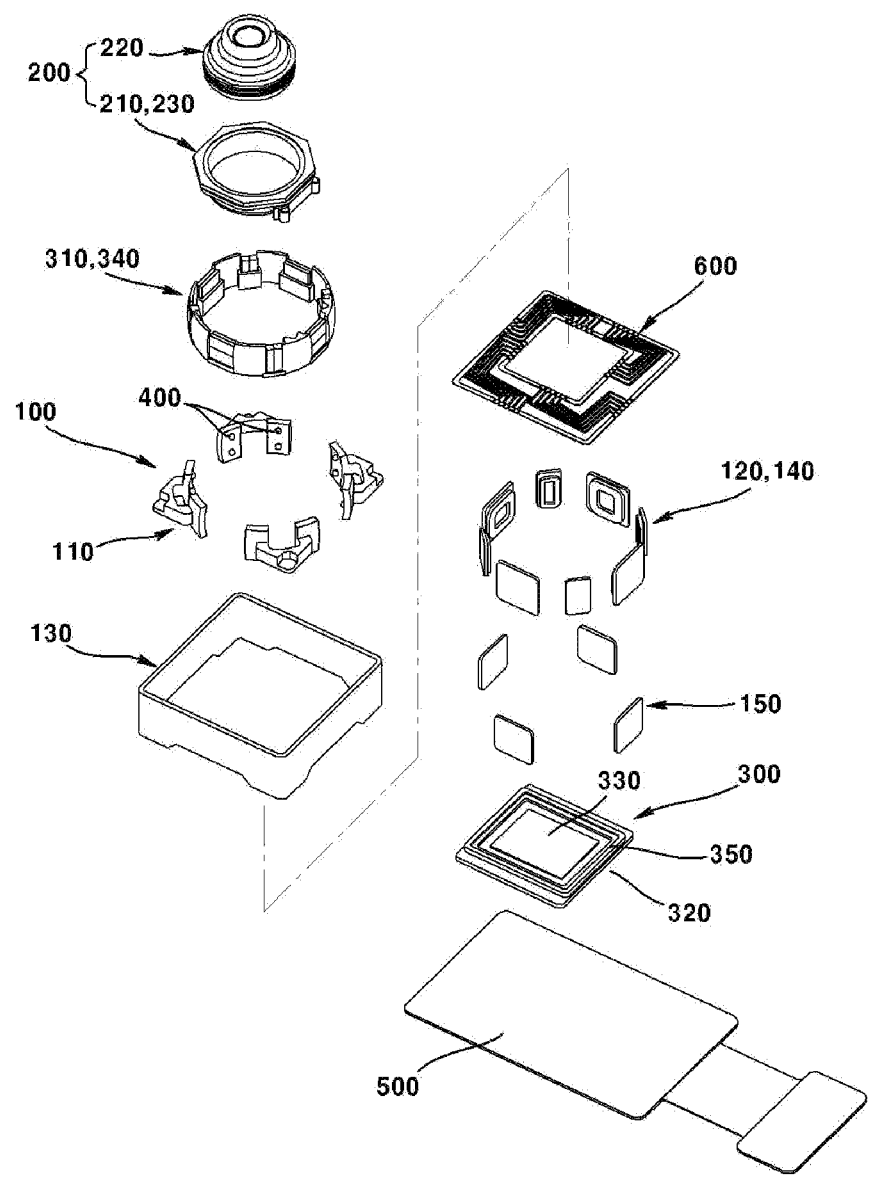
FIG. 9 is an exploded perspective view of a camera module according to the present embodiment.
Figure 10:
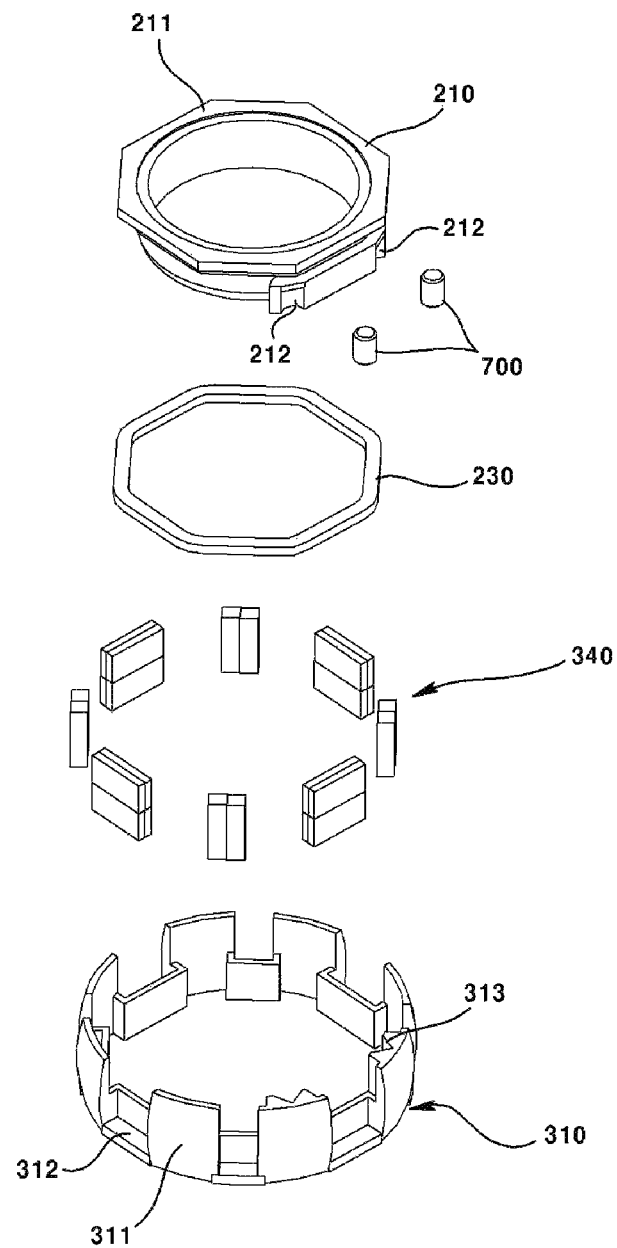
FIGS. 10 to 12 are exploded perspective views of a partial configuration of a camera module according to the present embodiment.
Figure 11:
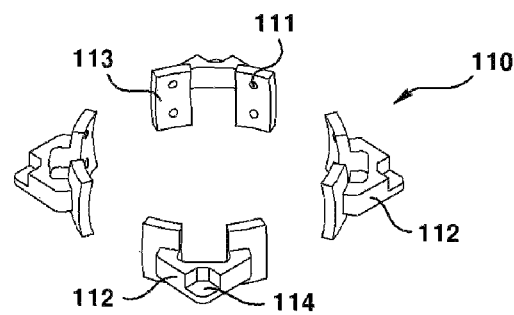
Figure 11:
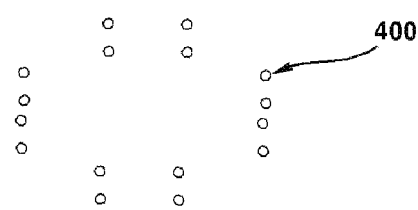
Figure 11:
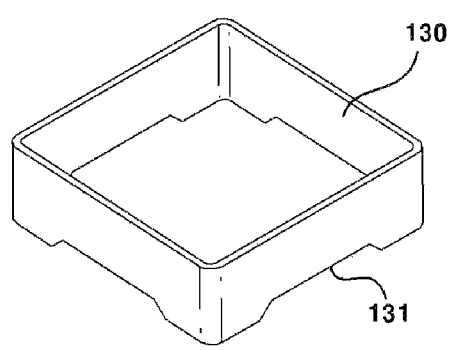
Figure 12:
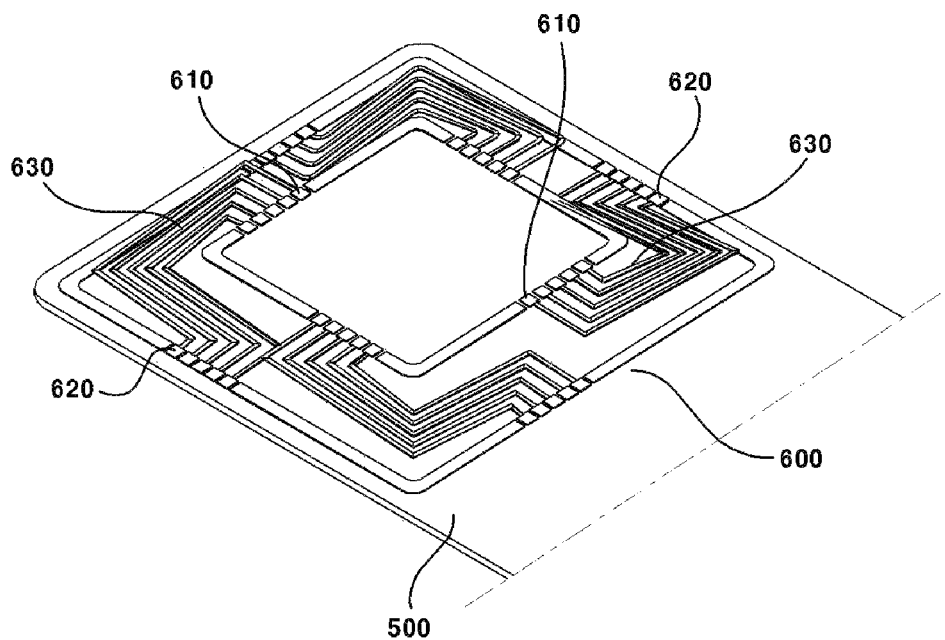
Figure 13:
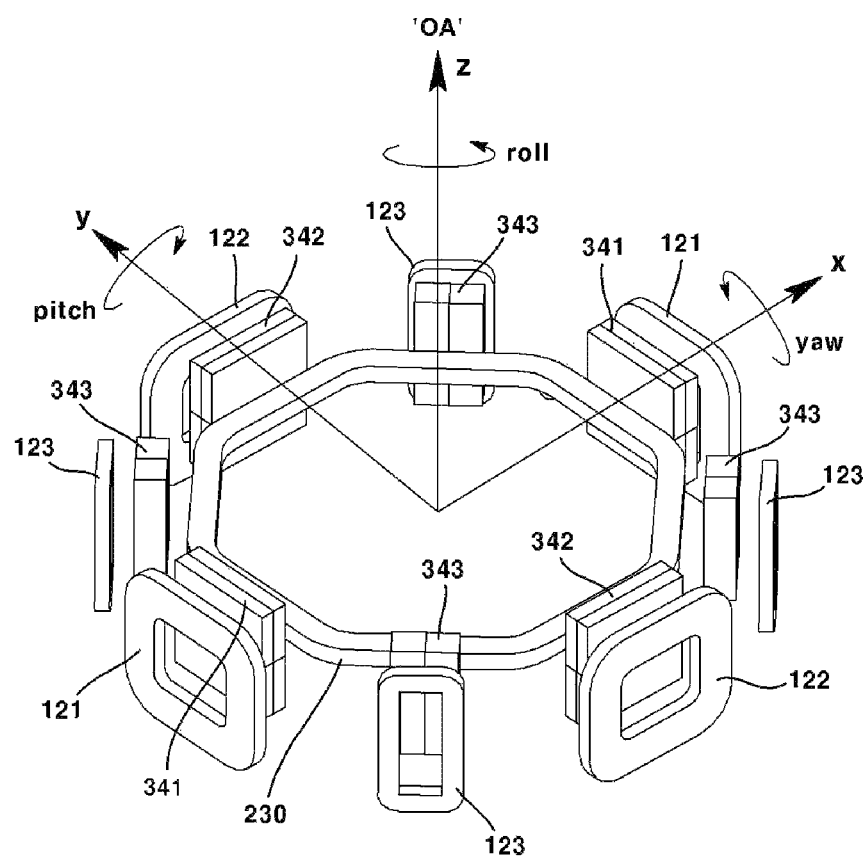
FIG. 13 is a view for explaining the arrangement structure and driving of the coil and magnet of the camera module according to the present embodiment.

FIG. 1 is a perspective view of a camera module according to the present embodiment; FIG. 2 is a plan view of a camera module according to the present embodiment; FIG. 3 is a side view of a camera module according to the present embodiment; FIG. 4 is a cross-sectional perspective view taken along line a-a in FIG. 2; FIG. 5 is a cross-sectional perspective view taken along line b-b in FIG. 2; FIG. 6 is a cross-sectional view taken along line c-c in FIG. 2; FIG. 7 is a cross-sectional perspective view taken along line d-d in FIG. 2; FIG. 8 is an enlarged cross-sectional view of a part of a camera module according to the present embodiment; FIG. 9 is an exploded perspective view of a camera module according to the present embodiment; FIGS. 10 to 12 are exploded perspective views of a partial configuration of a camera module according to the present embodiment; and FIG. 13 is a view for explaining the arrangement structure and driving of the coil and magnet of the camera module according to the present embodiment.

The camera module may be a camera device. The camera module may comprise a lens driving device. The lens driving device may be a voice coil motor (VCM). The lens driving device may be a lens driving motor. The lens driving device may be a lens driving actuator. The lens driving device may comprise an AF module. The lens driving device may comprise an OIS module.

The camera module may comprise a stator 100. The stator 100 may be spaced apart from the first mover 200. The stator 100 may be disposed below the first mover 200. The stator 100 may be disposed to surround the outer side surface of the first mover 200. The stator 100 may be spaced apart from the second mover 300. The stator 100 may be disposed below the second mover 300. The stator 100 may be a fixed part when the first mover 200 and/or the second mover 300 moves.

The stator 100 may comprise a curved surface. The stator 100 may comprise a first surface 113 comprising a curved surface. The curved surface of the first surface 113 may be a curved surface formed in an up-down direction. In addition, the curved surface of the first surface 113 may be a curved surface formed in a left-right direction or a horizontal direction. The curved surface of the stator 100 may be the curved surface of the housing 110. The first ball 400 may be disposed on the curved surface of the stator 100.

The stator 100 may comprise a housing 110. The housing 110 may be referred to as an OIS holder, a second holder, an outer shell, or the like. The housing 110 may be coupled to the second substrate 500. At this time, the housing 110 may be directly or indirectly coupled to the second substrate 500. That is, the housing 110 may be directly coupled to the second substrate 500 through an adhesive or the like. Or, another configuration may be interposed between the housing 110 and the second substrates 500. For example, the housing 110 may be coupled to the cover 130, and the cover 130 may be coupled to the second substrate 500. At this time, the housing 110 may not be directly coupled to the second substrate 500. The housing 110 may be disposed on the second substrate 500. The housing 110 may be disposed on the second substrate 5000. The housing 110 may be fixed to the second substrate 500. The housing 110 may move integrally with the second substrate 500. In addition, the housing 110 may be coupled or connected through the second substrate 500 and the substrate (for example, a third substrate 140 to be described later). The housing 110 may be disposed inside the cover 130. The housing 110 may be coupled to the cover 130.

The housing 110 may comprise a groove 111. The groove 111 may be formed in a shape corresponding to a portion of the first ball 400 on the first surface 113 of the housing 110. The groove 111 may comprise a plurality of grooves. The grooves 111 may be formed in a number corresponding to that of the first balls 400. The groove 111 may accommodate a portion of the first ball 400 so that the first ball 400 is rotatable. In addition, although not shown, a plurality of first balls 400 may be disposed in one groove 111, and the grooves 111 may be formed to be extended in the up-down direction on the first surface 113. The groove formed by being extended in the up-down direction may also have a curved surface being extended in the up-down direction. In addition, the first surface 113 may comprise a curved surface formed in the up-down direction, and the first ball 400 may be disposed on the curved surface formed in the up-down direction.

The housing 110 may comprise a body 112. The body 112 may comprise a plurality of bodies spaced apart from each other. Each of the plurality of bodies may be fixed to the inner surface of the side plate of the cover 130 or disposed at an inner side thereof. Each of the plurality of bodies may be fixed to the inner surface of the side plate of the cover 130 by an adhesive. The adhesive may comprise a bond and/or an epoxy. In addition, the body 112 may be coupled or connected through the second substrate 500 and the substrate (for example, the third substrate 140 to be described later). In addition, the plurality of bodies may be connected or coupled to one or a plurality of substrates (for example, a third substrate 140 to be described later).

The housing 110 may comprise a curved surface. The housing 110 may comprise a first surface 113 comprising a curved surface. The curved surface of the housing 110 may be protruded inward as it travels from the central portion toward the upper portion and the lower portion. The curved surface of the housing 110 may be formed on the inner side surface of the housing 110. The curved surface of the housing 110 may be recessed as it travels from the central portion toward the upper portion and the lower portion. The curved surface of the housing 110 may have a central portion concave more than the upper portion and the lower portion. The curved surface of the housing 110 may be formed so that the central portion is concave more outwardly than the upper portion and the lower portion. The curvature of the curved surface of the housing 110 may be the same as the curvature of the curved surface of the holder 310 at least in part. Through this, even if the holder 310 is tilted inside the housing 110, interference between the holder 310 and the housing 110 may be inhibited. Or, the curvature of the curved surface of the housing 110 may be smaller than the curvature of the curved surface of the holder 310. The curved surface of the housing 110 may comprise a plurality of curved surfaces.

The housing 110 may comprise a groove 114. The groove 114 may be an 'adhesive groove' in which an adhesive is disposed. The groove 114 may be formed in each of the plurality of bodies of the housing 110. An adhesive may be disposed in the groove 114. The adhesive disposed in the groove 114 may attach the housing 110 and the cover 130. The groove 114 may be formed in an upper surface of the housing 110.

The stator 100 may comprise a second coil 120. The second coil 120 may be an 'OIS coil' for driving the OIS. The second coil 120 may be disposed in the stator 100. The second coil 120 may be disposed in the housing 110. The second coil 120 may be disposed in the third substrate 140. The second coil 120 may be disposed in the stator 100 or the housing 110 through the third substrate 140. The second coil 120 may be electrically connected to the second substrate 500 through the third substrate 140. When a current is applied to the second coil 120, an electromagnetic field may be formed around the second coil 120. The second coil 120 may face the magnet 340. The second coil 120 may oppose the magnet 340. The second coil 120 may electromagnetically interact with the magnet 340. That is, the relative positions of the first coil 120 and the magnet 340 may be adjusted by the electromagnetic force generated by the electromagnetic interaction between the first coil 120 and the magnet 340. The second coil 120 may push the magnet 340 out (repulsive force) or pull it in (attractive force). In addition, the second coil 120 may form an electromagnetic force in a direction perpendicular to the direction in which the magnets 340 face each other. For example, the second coil 120 and the magnet 340 tilt at least one or all of the first mover 200, the third mover, the housing 110, and the lens 200 in the direction perpendicular to the optical axis (for example, the X-axis direction or the Y-axis direction perpendicular to the optical axis (Z-axis)), or may generate a force that rotates about the X-axis or the Y-axis.

The second coil 120 may comprise a plurality of coils. The second coil 120 may comprise a plurality of coils being spaced apart from one another. The second coil 120 may comprise a plurality of coils being electrically separated. The second coil 120 may comprise a plurality of coils to which current is individually applied. The second coil 120 may comprise: a first coil portion 121 for moving the holder 310 on which the magnet 340 is disposed in a first direction; a second coil portion 122 for moving it in a second direction; and a third coil portion 123 for moving it in a third direction. The second coil 120 may comprise at least three coils, and for an example, the second coil 120 may comprise eight coils.

The second coil 120 may comprise first to third coil portions 121, 122, and 123 to which current is applied individually. The first coil portion 121 may be a 'first OIS coil'. The second coil portion 122 may be a 'second OIS coil'. The third coil portion 123 may be a 'third OIS coil'. The first coil portion 121 may be a 'pitching coil' that drives the holder 310 in pitch direction. The second coil portion 122 may be a 'yawing coil' that drives the holder 310 in yaw direction. The third coil portion 123 may be a 'rolling coil' that drives the holder 310 in roll direction. The first to third coil portions 121, 122, and 134 may be referred to as second to fourth coils. As a modified embodiment, the first coil portion 121 may be a yawing coil and the second coil portion 122 may be a pitching coil.

When a current is applied to the first coil portion 121, the holder 310 may rotate about a first axis perpendicular to the optical axis. When a current is applied to the second coil portion 122, the holder 310 may rotate about an optical axis and a second axis perpendicular to the first axis. When a current is applied to the third coil portion 123, the holder 310 may rotate about the optical axis. At this time, the rotation may be tilting. Or, the rotation may be a pivot movement. The first axis is an x-axis, the second axis is a y-axis, and the optical axis may be a z-axis. However, the first axis is the y-axis and the second axis may be the x-axis.

When the holder 310 rotates, the bobbin 210, the lens 220, and the image sensor 330 rotate integrally with the holder 310 so that the distance between the lens 220 and the image sensor 330 can be maintained. That is, the OIS driving of the module tilt method according to the present embodiment can be distinguished from the lens shift method in which the image sensor is fixed and only the lens moves and the image sensor shift method in which the lens is fixed and only the image sensor moves. As in the present embodiment, through the module tilt method in which the lens and the image sensor move integrally, the problem of image quality degradation in the edge region of the image sensor, which is a problem of a method in which the lens and the image sensor move separately, can be solved.

The stator 100 may comprise second to fourth coils to which current is applied individually. At this time, the second to fourth coils may be the first to third coil portions 121, 122, and 123. In the present embodiment, when a current is applied to the first coil 230, the first mover 200 may move in the optical axis direction against the second mover 300. When a current is applied to the second coil, the second mover 300 may rotate about the optical axis against the stator 100. When a current is applied to the third coil, the second mover 300 may rotate about the first axis against the stator 100. When a current is applied to the fourth coil, the second mover 300 may rotate about the second axis against the stator 100. Meanwhile, the first mover 200 may also move when the second mover 300 moves. That is, the image sensor 330 of the second mover 300 and the lens 220 of the first mover 200 can move together.

The stator 100 may comprise a cover 130. The cover 130 may be coupled to the second substrate 500. The cover 130 may comprise a 'cover can'. The cover 130 may be disposed to surround the housing 110, the holder 310, and the bobbin 210. The cover 130 may be coupled to the housing 110. The cover 130 may form the outer appearance of the camera module. The cover 130 may have a hexahedral shape with an open lower surface. The cover 130 may be a non-magnetic material. The cover 130 may be formed of metal. The cover 130 may be formed of a metal plate. The cover 130 may be connected to the ground portion of the second substrate 500. Through this, the cover 130 may be grounded. The cover 130 may block electromagnetic interference (EMI). At this time, the cover 130 may be referred to as an 'EMI shield can'.

The cover 130 may comprise an upper plate and a side plate. However, in some embodiments, the upper plate may be omitted. The cover 130 may comprise an upper plate comprising a hole and a side plate being extended downward from an outer circumference or edge of the upper plate. A lower end of the side plate of the cover 130 may be disposed on the second substrate 500. The inner surface of the side plate of the cover 130 may be fixed to the housing 110 by an adhesive.

The side plate of the cover 130 may comprise a plurality of side plates. The plurality of side plates may comprise first to fourth side plates. The side plate of the cover 130 may comprise a first side plate and a second side plate being disposed opposite to each other, and a third side plate and a fourth side plate being disposed on opposite sides between the first side plate and the second side plate. The cover 130 may comprise a groove 131. The groove 131 may be formed at the lower end of the side plate.

The stator 100 may comprise a third substrate 140. The third substrate 140 may be a 'second coil substrate'. The third substrate 140 may be a printed circuit board (PCB) or a flexible printed circuit board (FPCB). The third substrate 140 may be coupled to the cover 130. The third substrate 140 may be coupled to the second substrate 500. The third substrate 140 may be connected to the second substrate 500. The third substrate 140 may be electrically connected to the second substrate 500. The third substrate 140 may be coupled to the housing 110. A second coil 120 may be disposed in the third substrate 140. A yoke 150 may be disposed in the third substrate 140.

The third substrate 140 may comprise a first surface facing the magnet 340 and a second surface opposite to the first surface. The second coil 120 may be disposed on the first surface of the third substrate 140. A yoke 150 made of a metal material may be disposed on the second surface of the third substrate 140. That is, the second coil 120 and the yoke 150 may be disposed opposite to each other with the third substrate 140 interposed therebetween.

The stator 100 may comprise a yoke 150. The yoke 150 may be disposed in the third substrate 140. The yoke 150 may be disposed on the second surface of the third substrate 140. The yoke 150 may be formed of a metal material. The yoke 150 may comprise metal. An attractive force may act between the yoke 150 and the magnet 340. That is, a force to move toward the yoke 150 may be generated in the magnet 340. Through this, the magnet 340 may be disposed at the initial position in a state in which no current is applied to the second coil 120. That is, if the magnet 340 is not in the correct position in a state in which the current supply is stopped after an external force is applied or the current is applied to the second coil 120 or the like, the magnet 340 can be moved to the original position by the attractive force between the yoke 150 and the magnet 340. At this time, the holder 310 may move integrally with the magnet 340. Furthermore, the first mover 200 may also move integrally with the magnet 340 and the holder 310.

The camera module may comprise a first mover 200. The first mover 200 may be disposed inside the stator 100. The first mover 200 may be disposed in a hole of the stator 100. The first mover 200 may be accommodated in the stator 100. The first mover 200 may be disposed inside the second mover 300. The first mover 200 may be spaced apart from the stator 100. The first mover 200 may be spaced apart from the second mover 300. The first mover 200 may be movably disposed in an optical axis direction against the second mover 300. The first mover 200 may move separately from the second mover 300 when moving in the optical axis direction. However, in the case of movement in a direction other than the optical axis direction, the first mover 200 and the second mover 300 may move integrally. Or, as a modified embodiment, the first mover 200 in a specific direction may move integrally with the second mover 300 or move separately.

The first mover 200 may comprise a bobbin 210. The bobbin 210 may be disposed inside the holder 310. The bobbin 210 may be disposed inside the cover 130. The bobbin 210 may be coupled to the lens 220. The bobbin 210 may be disposed in the hole of the holder 310. The bobbin 210 may be movably coupled to the holder 310. The bobbin 210 may move in an optical axis direction against the holder 310. A lens 220 may be coupled to the bobbin 210. The bobbin 210 and the lens 220 may be coupled by screw-coupling and/or an adhesive. The first coil 230 may be coupled to the bobbin 210.

The first mover 200 may comprise a lens 220. The lens 220 may be disposed in the bobbin 210. The lens 220 may be coupled to the bobbin 210. The lens 220 may comprise a plurality of lenses. The lens 220 may be disposed at a position corresponding to the image sensor 330. The lens 220 may be disposed inside the barrel. A barrel may be disposed between the lens 220 and the bobbin 210. In more detail, the plurality of lenses 220 may be coupled to the barrel and the barrel may be coupled to the bobbin 210. The lens 220 may be coupled to the bobbin 210 by screw-coupling and/or an adhesive. The lens 220 may move integrally with the bobbin 210.

In the present embodiment, when the second mover 300 rotates, the lens 220 may rotate together with the image sensor 330. That is, the present embodiment can perform OIS driving in a module tilt method. However, during AF driving, only the lens 220 is moved while the image sensor 330 is fixed, so that the distance between the image sensor 330 and the lens 220 may be changed.

The first mover 200 may comprise a first coil 230. The first coil 230 may be an 'AF coil' for AF driving. The first coil 230 may be disposed in the bobbin 210. The first coil 230 may be disposed between the holder 310 and the bobbin 210. The first coil 230 may be disposed between the bobbin 210 and the cover 130. The first coil 230 may be wound along the outer side surface of the bobbin 210. The first coil 230 may be electrically connected to the first substrate 320. The first coil 230 may be electrically connected to the second substrate 500. The first coil 230 may be electrically connected to the third substrate 140. When a current is applied to the first coil 230, an electromagnetic field may be formed around the first coil 230. The first coil 230 may face the magnet 340. The first coil 230 may oppose the magnet 340. The first coil 230 may adjust the relative positions of the first coil 230 and the magnet 340 by electromagnetic force generated by electromagnetic interaction with the magnet 340. That is, the first coil 230 may push the magnet 340 out (repulsive force) or pull it in (attractive force). In addition, the first coil 230 may form an electromagnetic force in a direction perpendicular to the direction in which the magnets 340 face each other (for example, the optical axis direction (Z-axis direction)).

The first coil 230 may be formed as a single coil. Or, as a modified embodiment, the first coil 230 may comprise a plurality of coils. When a current is applied to the first coil 230, the bobbin 210 moves along the optical axis due to electromagnetic interaction between the first coil 230 and the magnet 340, and the distance between the lens 220 and the image sensor 330 can be changed.

The camera module may comprise a second mover 300. The second mover 300 may be disposed between the stator 100 and the first mover 200. The second mover 300 may be rotatably disposed against the stator 100 about an optical axis, a first axis perpendicular to the optical axis, and a second axis perpendicular to the optical axis and the first axis, respectively.

The second mover 300 may comprise a curved surface. The second mover 300 may comprise a curved surface and a second surface 311 facing the first surface of the stator 100. The curved surface of the second mover 300 may be the curved surface of the holder 310. The first ball 400 may be disposed on the curved surface of the second mover 300.

The second mover 300 may comprise a holder 310. The holder 310 may be disposed inside the housing 110. The holder 310 may be disposed at an outer side of the bobbin 210. The holder 310 may be disposed between the bobbin 210 and the housing 110. The holder 310 may be disposed on the first substrate 320. The holder 310 may be formed of an insulator.

The holder 310 may comprise a second surface 311. The second surface 311 may comprise a curved surface. The second surface 311 may face the first surface 113 of the housing 110. The curved surface of the holder 310 may be formed to correspond to the curved surface of the first surface 113 of the housing 110. The curved surface of the holder 310 may be formed so that the central portion is more convex than the upper portion and the lower portion. The curved surface of the holder 310 may be formed so that the central portion is more convex toward the outer side than the upper portion and the lower portion. The curved surface of the holder 310 may be more recessed as it travels from the central portion toward the upper portion and the lower portion. The curved surface of the holder 310 may be more protruded outward as it travels from central portion toward the upper portion and the lower portion. The curved surface may comprise a plurality of curved surfaces.

In a modified embodiment, the holder 310 may comprise a groove. At this time, the groove may be a 'ball accommodating groove' for accommodating the first ball 400. The groove may be formed in a shape corresponding to a portion of the first ball 400 on the second surface 311 of the holder 310. The groove may comprise a plurality of grooves. The grooves may be formed in a number corresponding to the first ball 400. The groove may accommodate a portion of the first ball 400 so that the first ball 400 is rotatable.

In the first embodiment, when the groove 111 in which the first ball 400 is disposed is formed in the housing 110, the groove may not be formed in the holder 310. Conversely, when the groove in which the first ball 400 is disposed is formed in the holder 310 in a second embodiment, the groove may not be formed in the housing 110. When a groove in which the first ball 400 is disposed is formed in both the housing 110 and the holder 310, the tilting movement of the holder 310 may be limited.

The holder 310 may comprise a groove 312. The groove 312 may be a 'magnet accommodating groove' for accommodating the magnet 340. The groove 312 may be formed on the outer circumferential surface of the holder 310. A magnet 340 may be disposed in the groove 312. The groove 312 may comprise a shape corresponding to the shape of at least a portion of the magnet 340.

The holder 310 may comprise a groove 313. The groove 313 may be a 'ball accommodating groove' for accommodating the second ball 700. The groove 313 may be extended longer than the diameter of the second ball 700 in an optical axis direction. Through this, the second ball 700 may move along the groove 313 in the optical axis direction. That is, the groove 313 may guide the movement of the bobbin 210 in the optical axis direction through contact with the second ball 700.

The second mover 300 may comprise a first substrate 320. The first substrate 320 may be an 'image sensor substrate' in which the image sensor 330 is disposed. The first substrate 320 may be a printed circuit board (PCB) or a flexible printed circuit board (FPCB). The first substrate 320 may be coupled to the holder 310. The first substrate 320 may be directly coupled or indirectly coupled to the holder 310.

The second mover 300 may comprise an image sensor 330. The image sensor 330 may be disposed in the first substrate 320. The image sensor 330 may have a configuration in which light passing through the lens 220 and the filter is incident to form an image. The image sensor 330 may be mounted on the first substrate 320. The image sensor 330 may be electrically connected to the first substrate 320. For example, the image sensor 330 may be coupled to the first substrate 320 by a surface mounting technology (SMT). The image sensor 330 may be disposed such that the lens 220 and the optical axis coincide with each other. That is, the optical axis of the image sensor 330 and the optical axis of the lens 220 may be aligned. The image sensor 330 may convert light irradiated to the effective image area of the image sensor 330 into an electrical signal. The image sensor 330 may be any one among a charge coupled device (CCD), a metal oxide semiconductor (MOS), a CPD, and a CID.

The second mover 300 may comprise a magnet 340. The magnet 340 may be disposed in the holder 310. The magnet 340 may be disposed on an outer circumferential surface of the holder 310. The magnet 340 may face the first coil 230 and the second coil 120. The magnet 340 may electromagnetically interact with the first coil 230 and the second coil 120. When a current is applied to the first coil 230, the magnet 340 may move the first coil 230. When a current is applied to the second coil 120, the magnet 340 may move. The magnet 340 may be a flat magnet having a flat plate shape.

The magnet 340 may comprise a plurality of magnets. The magnet 340 may comprise a total of eight magnets. The magnet 340 may comprise first to third magnets 341, 342, and 343. The magnet 340 may comprise a 'common magnet' used in common for AF driving and OIS driving and an 'OIS magnet' used for OIS driving. Furthermore, as a modified embodiment, a magnet used only for AF driving may be provided.

The first magnet 341 may comprise a first surface facing the first coil 230 and a second surface being disposed at an opposite side of the first surface and facing the first coil portion 121. The second magnet 342 may comprise a first surface facing the first coil 230 and a second surface disposed at an opposite side of the first surface of the second magnet 342 and facing the second coil portion 122. The third magnet 343 may face the third coil portion 123. The third magnet 343 may not participate in electromagnetic interaction with the first coil 230. However, in a modified embodiment, the third magnet 343 may also face the first coil 230 and electromagnetically interact.

The second surface of each of the first magnet 341 and the second magnet 342 may comprise a first region and a second region disposed below the first region and having a polarity different from that of the first region. At this time, 'below' may mean disposed below in the optical axis direction. The first region may be the N pole and the second region may be the S pole. Conversely, the first region may be the S pole and the second region may be the N pole.

The third magnet 343 may comprise a first surface facing the third coil portion 123. The first surface of the third magnet 343 may comprise a first region and a second region disposed at the side of the first region of the third magnet 343 and having a polarity different from that of the first region of the third magnet 343. At this time, being disposed at the 'side' may mean being disposed next to the side, at the left or right side, in a direction perpendicular to the optical axis. The first region may be the N pole and the second region may be the S pole. Conversely, the first region may be the S pole and the second region may be the N pole. The third magnet 343 may be a two-pole magnetized single magnet.

The first surface of each of the first magnet 341 and the second magnet 342 may comprise a third region and a fourth region disposed below the third region and having a polarity different from that of the third region. The third region may be the N pole and the fourth region may be the S pole. Conversely, the third region may be the S pole and the fourth region may be the N pole. Each of the first magnet 341 and the second magnet 342 may be a four-pole magnetized magnet in which magnets having two polarities are overlapped. Each of the first magnet 341 and the second magnet 342 may comprise two regions having an S polarity and two regions having an N polarity.

The first coil 230 may be overlapped with any one of a third region and a fourth region of the first magnet 341 and the second magnet 342 in a direction perpendicular to the optical axis. In addition, the first coil 230 may be overlapped with only one of the third region and the fourth region of the first magnet 341 and the second magnet 342 in a direction perpendicular to the optical axis. That is, the first coil 230 may not be overlapped with the other one of the third region and the fourth region of the first magnet 341 and the second magnet 342 in a direction perpendicular to the optical axis. In this case, an initial state in which no current is applied to the first coil 230 has been described, and in some embodiments, in a state in which current is applied to the first coil 230, the first coil 230 may be overlapped with all of the third region and the fourth region. However, in some embodiments, even in a driving state in which current is applied to the first coil 230, the first coil 230 may be overlapped with only one of the third region and the fourth region. For example, the first coil 230 may be overlapped with the third region of each of the first magnet 341 and the second magnet 342 in a direction perpendicular to the optical axis.

The first magnet 341 may comprise two magnets symmetrical to the optical axis. The second magnet 342 may comprise two magnets symmetrical to the optical axis. The third magnet 343 may comprise four magnets. The magnet 340 may comprise a total of eight magnets.

The second mover 300 may comprise a sensor housing 350. The sensor housing 350 may be disposed between the bobbin 210 and the first substrate 320. The sensor housing 350 may comprise a hole penetrating the sensor housing 350 in the optical axis direction.

The second mover 300 may comprise a filter (not shown). The filter may be disposed in the sensor housing 350. The filter may serve to block light of a specific frequency band from being incident on the image sensor 330 in light passing through the lens 220. The filter may be disposed parallel to the x-y plane. The filter may be disposed between the lens 220 and the image sensor 330. The filter may comprise an infrared filter. The infrared filter may block light in the infrared region from being incident on the image sensor 330.

The camera module may comprise a first ball 400. The first ball 400 may be disposed between the first surface 113 of the stator 100 and the second surface 311 of the second mover 300. The first ball 400 may guide the movement of the second mover 300. The first ball 400 may be disposed between the housing 110 and the holder 310. The first ball 400 may be disposed between the first surface 113 of the housing 110 and the second surface 3110 of the holder 310. A portion of the first ball 400 may be accommodated in the groove 111. At this time, the first ball 400 may move along the curved surface of the holder 310. In a modified embodiment, a portion of the first ball 400 may be accommodated in a groove of the holder 310. At this time, the first ball 400 may move along the curved surface of the housing 110. The first ball 400 may be a guide member.

The first ball 400 may comprise a plurality of balls. The first ball 400 may comprise 16 balls. The first ball 400 may comprise a total of 16 balls. The first ball 400 may comprise eight balls through which a first virtual plane perpendicular to the optical axis passes and eight balls through which a second virtual plane perpendicular to the optical axis and spaced apart from the first plane passes. At this time, the first plane may be parallel to the second plane and may be disposed below the second plane. The first ball 400 may comprise eight balls being disposed at an upper portion of the holder 310 and the housing 110, and eight balls being disposed on a lower portion of the holder 310 and the housing 110.

The first ball 400 may comprise four balls through which the third virtual plane comprising the optical axis passes. The four balls may be symmetrical with respect to the optical axis. As such, there may be four virtual third planes comprising the optical axis. That is, eight balls are disposed on a virtual plane formed in a direction perpendicular to the optical axis, but four balls may be disposed on a virtual plane being formed to comprise the optical axis.

The camera module may comprise a second substrate 500. The second substrate 500 may be a 'main substrate' being electrically connected to the outside. At this time, the outside may be a power supply and/or control unit of the optical device. The second substrate 500 may be disposed below the first substrate 320. The second substrate 500 may be a printed circuit board (PCB) or a flexible printed circuit board (FPCB). The second substrate 500 may be a rigid circuit board (RPCB). The second substrate 500 may be a rigid flexible circuit board (RFPCB) in which the RPCB and the FPCB are connected. The second substrate 500 may comprise a connector for connection with an external component.

The camera module may comprise an elastic member 600. The elastic member 600 may be an 'interposer'. The elastic member 600 may comprise a leaf spring. The elastic member 600 may have elasticity at least in part. The elastic member 600 may be formed of metal. The elastic member 600 may connect the first substrate 320 and the second substrate 500. The elastic member 600 may be formed such that the first substrate 320 and the second substrate 500 are spaced apart from each other in an initial state in which no current is applied to the first coil 230 and the second coil 120. The elastic member 600 may be formed such that the first substrate 320 and the second substrate 500 are disposed at different heights. The first substrate 320 and the second substrate 500 may be disposed at different levels. However, the separation between the first substrate 320 and the second substrate 500 may be due to a coupling or arrangement structure between the housing 110 and the holder 310 being fixed to the cover 130.

The elastic member 600 may comprise a plurality of elastic portions. The elastic portion may be an elastic unit. The plurality of elastic portions may be spaced apart from one another. The plurality of elastic portions may be electrically separated. The plurality of elastic portions may electrically connect the first substrate 320 and the second substrate 500. The plurality of elastic portions may comprise at least 20 elastic portions. The plurality of elastic portions may comprise 24 or more elastic portions.

The elastic member 600 may comprise an inner side portion 610 being coupled to the first substrate 320, an outer side portion 620 being coupled to the second substrate 500, a connection portion 630 for connecting an inner side portion 610 and an outer side portion 620. The elastic member 600 may also comprise an elastic portion made of only the inner side portion 610 and an elastic portion made of only the outer side portion 620.

The connection portion 630 may have elasticity. The connection portion 630 may comprise a curved shape. The connection portion 630 may comprise a shape bent at least twice. The connection portion 630 may comprise a shape bent three or more times. The connection portion 630 may comprise a bent shape. The connection portion 630 may comprise a curved shape. The connection portion 630 may comprise an offset shape. The connection portion 630 may comprise a shape being bent.

The camera module may comprise a second ball 700. The second ball 700 may be disposed between the bobbin 210 and the holder 310. The second ball 700 may guide the AF driving of the bobbin 210. The second ball 700 may be formed as a cylindrical guide member in a modified embodiment. The second ball 700 may be rotatably disposed in the bobbin 210. The second ball 700 may move along the groove 313 of the holder 310. The second ball 700 may be a guide member.

As a modified embodiment, the camera module may comprise an elastic member (not shown). The elastic member may be an 'AF elastic member' that supports the AF driving of the bobbin 210. The elastic member may connect the bobbin 210 and the holder 310. The elastic member may comprise an inner side portion being coupled to the bobbin 210, an outer side portion being coupled to the holder 310, and a connection portion connecting the inner side portion and the outer side portion.

The holder 310 may be tilt-driven against the housing 110.

The upper portion of the second surface of the holder 310 is the uppermost portion where the guide member is in contact with when the holder 310 is tilted about the first axis perpendicular to the optical axis of the lens, and the lower portion of the second surface may be the lowermost portion where the guide member is in contact with when the holder 310 is tilted about the first axis. The outer circumference of the holder 310 may have a circular shape.

The thickness of the outer circumference of the holder 310 may be formed so that the central portion is thicker than the upper portion or the lower portion. The stator 100 may be a part that is not moved by a driving unit (coil, magnet). The mover may be a part driven or moved by a driving unit (coil, magnet). The stator 100 may comprise a space member for disposing the first substrate 320 and the second substrate 500 to be spaced apart from each other. The space member may be a cover member. The cover member may be a cover 130.

Hereinafter, an optical device according to the present embodiment will be described with reference to the drawings.

Figure 14:
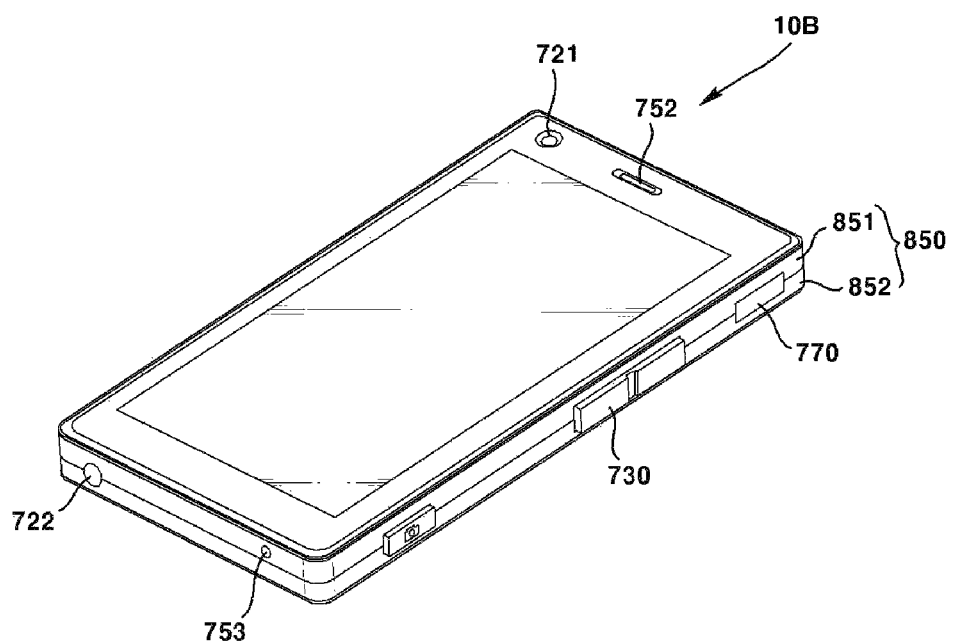
FIG. 14 is a perspective view of an optical device according to the present embodiment.
Figure 15:
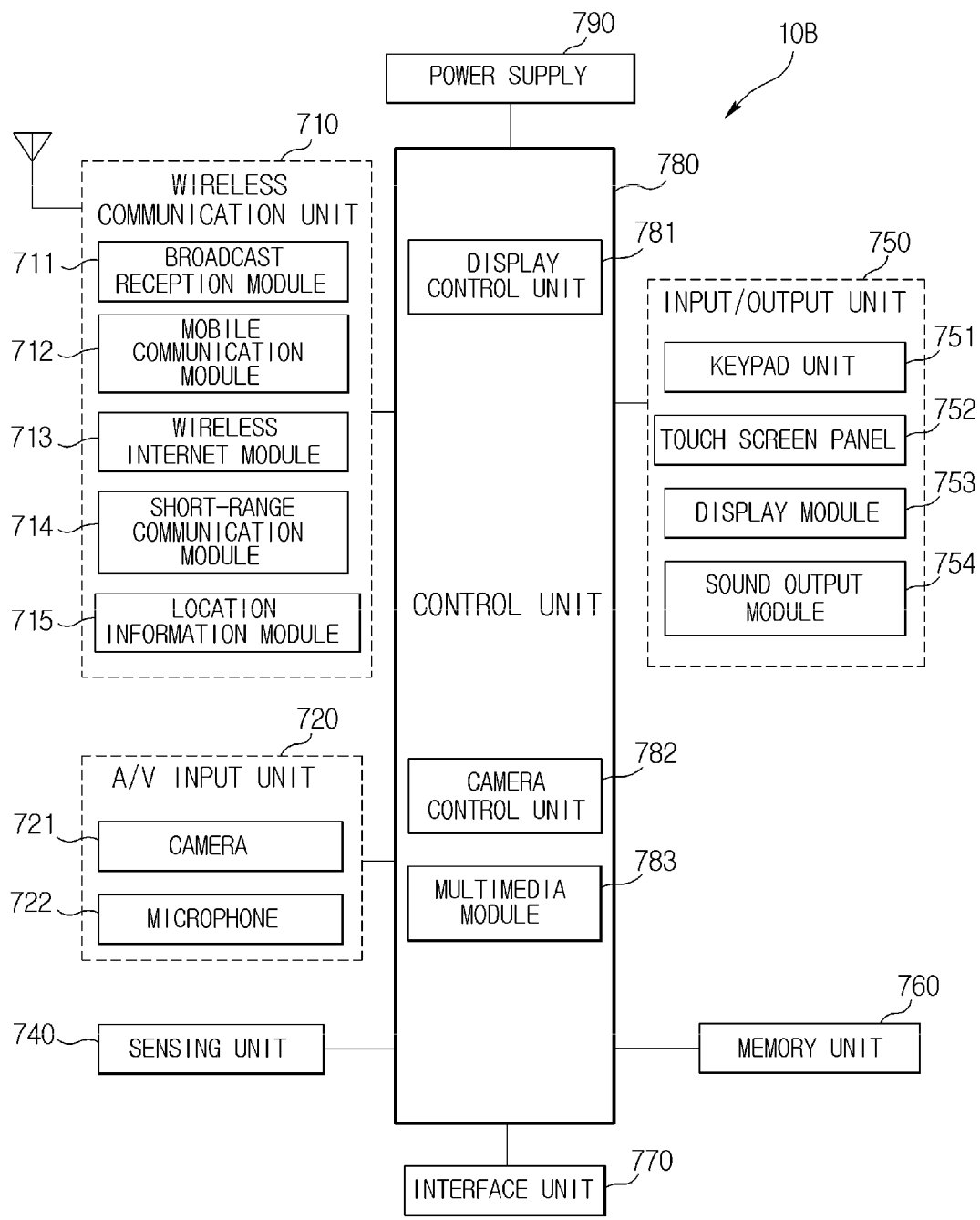
FIG. 15 is a block diagram of the optical device illustrated in FIG. 14.

FIG. 14 is a perspective view of an optical device according to the present embodiment; and FIG. 15 is a block diagram of the optical device illustrated in FIG. 14.

The optical device 10B may be any one among a mobile phone, a mobile phone, a smart phone, a portable smart device, a digital camera, a laptop computer, a digital broadcasting terminal, a personal digital assistant (PDA), a portable multimedia player (PMP), and a navigation device. However, the type of the optical device 10B is not limited thereto, and any device for photographing an image or a picture may be comprised in the optical device 10B.

The optical device 10B may comprise a main body 850. The main body 850 may have a bar shape. Or, the main body 850 may have various structures such as a slide type, a folder type, a swing type, and a swirl type, in which two or more sub-bodies are coupled to be relatively movable. The main body 850 may comprise a case (casing, housing, and cover) forming an outer appearance. For example, the main body 850 may comprise a front case 851 and a rear case 852. Various electronic components of the optical device 10B may be embedded in a space formed between the front case 851 and the rear case 852. A display module 753 may be disposed on one surface of the main body 850. A camera 721 may be disposed on one or more surfaces among one surface and the other surface disposed at an opposite side of the one surface of the main body 850.

The optical device 10B may comprise a wireless communication unit 710. The wireless communication unit 710 may comprise one or more modules that enable wireless communication between the optical device 10B and a wireless communication system or between the optical device 10B and a network in which the optical device 10B is located. For example, the wireless communication unit 710 may comprise any one or more among a broadcast reception module 711, a mobile communication module 712, a wireless Internet module 713, a near field communication module 714, and a location information module 715.

The optical device 10B may comprise an A/V input unit 720. The A/V input unit 720 is for inputting an audio signal or a video signal, and may comprise any one or more of a camera 721 and a microphone 722. At this time, the camera 721 may comprise the camera module according to the present embodiment.

The optical device 10B may comprise a sensing unit 740. The sensing unit 740 may generate a sensing signal for controlling the operation of the optical device 10B by detecting the current state of the optical device 10B such as the opening/closing state of the optical device 10B, the position of the optical device 10B, the presence or absence of user contact, the orientation of the optical device 10B, acceleration/deceleration of the optical device 10B, and the like. For example, when the optical device 10B is in the form of a slide phone, it is possible to sense whether the slide phone is opened or closed. In addition, it may be responsible for sensing functions related to whether the power supply unit 790 is supplied with power, whether the interface unit 770 is coupled to an external device, and the like.

The optical device 10B may comprise an input/output unit 750. The input/output unit 750 may be configured to generate an input or output related to visual, auditory, or tactile sense. The input/output unit 750 may generate input data for controlling the operation of the optical device 10B, and may output information processed by the optical device 10B.

The input/output unit 750 may comprise any one or more among a keypad unit 730, a display 751, a sound output module 752, and a touch screen panel 753. The keypad unit 730 may generate input data in response to a keypad input. The display 751 may output an image photographed by the camera 721. The display 751 may comprise a plurality of pixels whose color changes according to an electrical signal. For example, the display 751 may comprise at least one among a liquid crystal display, a thin film transistor-liquid crystal display, an organic light-emitting diode, a flexible display, and a three-dimensional (3D) display. The sound output module 752 outputs audio data being received from the wireless communication unit 710 in call reception mode, call mode, recording mode, voice recognition mode, broadcast reception mode, or the like, or may output audio data stored in the memory unit 760. The touch screen panel 753 may convert a change in capacitance generated due to a touch of a user on a specific region of the touch screen into an electrical input signal The optical device 10B may comprise a memory unit 760. A program for processing and controlling the control unit 780 may be stored in the memory unit 760. In addition, the memory unit 760 may store input/output data, for example, any one or more among a phone book, a message, an audio, a still image, a photo, and a video. The memory unit 760 may store an image photographed by the camera 721, for example, a photo or a video.

The optical device 10B may comprise an interface unit 770. The interface unit 770 plays the role of a path for connecting to an external device connected to the optical device 10B. The interface unit 770 may receive data from an external device, receive power and transmit it to each component inside the optical device 10B, or transmit data inside the optical device 10B to an external device. The interface unit 770 may comprise any one or more among wired/wireless headset port, external charger port, wired/wireless data port, memory card port, port for connecting devices equipped with identification module, audio input/output (I/O) port, video input/output (I/O) port, and earphone port.

The optical device 10B may comprise a control unit 780. The control unit 780 may control the overall operation of the optical device 10B. The control unit 780 may perform related control and processing for voice call, data communication, video call, and the like. The control unit 780 may comprise a multimedia module 781 for playing multimedia. The multimedia module 781 may be provided inside the control unit 180 or may be provided separately from the control unit 780. The control unit 780 may perform a pattern recognition process capable of recognizing a handwriting input or a drawing input performed on the touch screen as characters and images, respectively.

The optical device 10B may comprise a power supply 790. The power supply unit 790 receives external power or internal power under the control of the control unit 780 and may supply power required for the operation of each component.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A camera module comprising:
   a housing comprising a first surface;
   a holder comprising a lens, and comprising a second surface facing the first surface and formed on an outer side surface of the holder; and
   a guide member disposed between the first surface and the second surface,
   wherein each of the first surface and the second surface has a curved surface,
   wherein the curved surface of the second surface is a curved surface in which a central portion is convex outwardly relative to an upper portion and a lower portion, and
   wherein the curved surface of the first surface is a curved surface in which a central portion is concave relative to an upper portion and a lower portion.

2. The camera module of claim 1, wherein the holder is tilt-driven against the housing,
   wherein the upper portion of the second surface is the uppermost portion with which the guide member is in contact when the holder is tilted about a first axis perpendicular to an optical axis of the lens, and
   wherein the lower portion of the second surface is the lowermost portion with which the guide member is in contact when the holder is tilted about the first axis.

3. The camera module of claim 1, wherein an outer periphery of the holder has a circular shape, and
   wherein a thickness of the outer periphery of the holder is formed such that a central portion is thicker than an upper portion or a lower portion of the holder.

4. The camera module of claim 1, wherein the first surface comprises a groove in which the guide member is disposed.

5. The camera module of claim 4, wherein the guide member is fixed to the groove.

6. The camera module of claim 1, wherein a curvature of the curved surface of the first surface is same as a curvature of the curved surface of the second surface.

7. The camera module of claim 1, wherein a curvature of the curved surface of the first surface and a curvature of the curved surface of the second surface are different from each other.

8. The camera module of claim 1, wherein the guide member comprises a first ball and a second ball, and
   wherein the first ball and the second ball are disposed at positions symmetrical to each other with respect to the central portion on the second surface.

9. The camera module of claim 1, comprising:
   a bobbin disposed in the holder;
   a first coil disposed on the bobbin;
   a magnet disposed on the holder; and
   a second coil disposed on the housing.

10. The camera module of claim 9, comprising:
    a first substrate coupled with the holder;
    a lens disposed on the bobbin; and
    an image sensor disposed on the first substrate.

11. An optical device comprising:
    a main body;
    the camera module of claim 1 disposed on the main body; and
    a display disposed on the main body and configured to output an image photographed by the camera module.

12. A camera module comprising:
    a stator comprising a first surface;

a mover comprising a lens and comprising a second surface facing the first surface and tilt-driven with respect to the stator with respect to three different axes; and a guide member disposed between the first surface and the second surface, wherein each of the first surface and the second surface has a curved surface, and wherein the curved surface of each of the first surface and the second surface is a curved surface formed in a direction in which the mover is tilted.

13. A camera module comprising:

a stator comprising a first surface;

a mover comprising a lens and a second surface facing the stator; and a guide member disposed between the first surface and the second surface, wherein each of the first surface and the second surface has a curved surface, wherein the mover comprises a first substrate in which an image sensor is disposed, wherein the stator comprises a second substrate electrically connected to the image sensor and disposed to be spaced apart from the first substrate, wherein the camera module comprises an interposer elastically connecting the first substrate and the second substrate and delivering a signal outputted from the image sensor, and wherein at least a portion of the interposer is disposed between the first substrate and the second substrate.

14. The camera module of claim 13, comprising:

a second substrate disposed below the first substrate; and an elastic member connecting the first substrate and the second substrate, wherein the housing is coupled to the second substrate.

15. The camera module of claim 14, wherein the elastic member is formed such that the first substrate and the second substrate are spaced apart from each other in an initial state in which no current is applied to the first coil and the second coil.

16. The camera module of claim 14, wherein the elastic member comprises an inner portion coupled to the first substrate, an outer portion coupled to the second substrate, and a connection portion connecting the inner side portion and the outer side portion, and wherein the connection portion has elasticity and comprises a bent shape.

17. The camera module of claim 14, wherein the elastic member comprises a plurality of elastic portions spaced apart from each other and electrically connecting the first substrate and the second substrate, and wherein the plurality of elastic portions comprise at least twenty elastic portions.

18. The camera module of claim 14, comprising a cover coupled to the second substrate, wherein the housing is disposed in the cover and coupled to the cover.

19. The camera module of claim 18, wherein the housing comprises a plurality of bodies spaced apart from each other, and wherein each of the plurality of bodies is fixed to an inner surface of a side plate of the cover by an adhesive.

20. The camera module of claim 14, comprising a third substrate electrically connected to the second substrate, and wherein the second coil is disposed on the third substrate.

* * * * *